Figure 1:
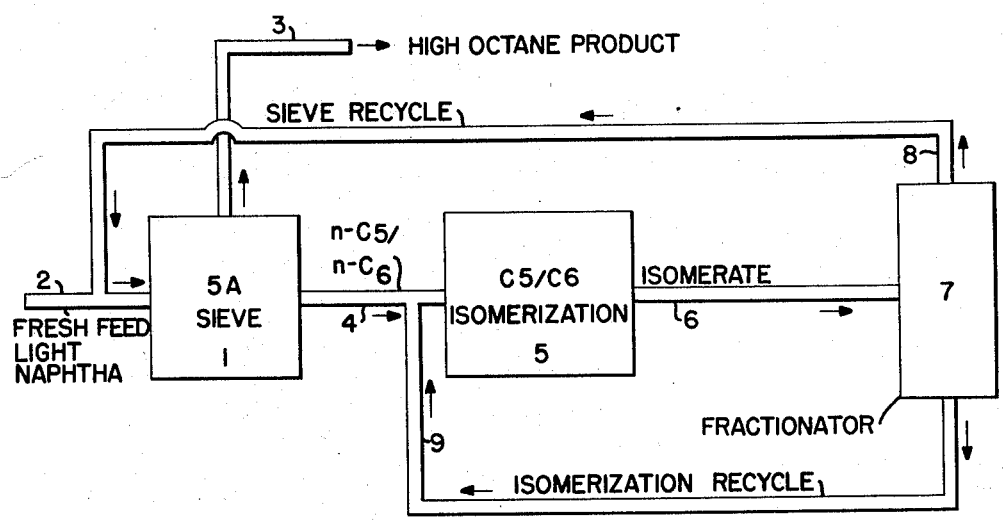

Leon Bleich  Inventor

By W. O. Heilman Attorney

2,909,583

PROCESS FOR THE PREPARATION OF HIGH OCTANE NUMBER FUELS

Leon Bleich, Roselle, N.J., assignor to Esso Research and Engineering Company, a corporation of Delaware Application October 18, 1957, Serial No. 690,973

7 Claims. (Cl. 260—683.73)

The present invention is concerned with an improved process for the preparation of high octane number fuels. The invention is more particularly directed toward a combination operation utilizing an arrangement of adsorption stages in combination with an isomerization and a fractionation stage. The invention is particularly directed toward an integrated process employing a molecular sieve stage in particular combination with an isomerization and a fractionation stage whereby fuels of high octane numbers are produced.

Various processes are known and had been suggested in the art for upgrading relatively low octane number fuel fractions. As mentioned heretofore, the present invention is concerned with the utilization of an adsorbent stage, particularly, a zeolite adsorption stage in an integrated process also utilizing a fraction and an isomerization stage. The feed fraction for use in accordance with the present invention, preferably, comprises a fraction containing normal pentanes and normal hexanes. This fraction boils from about the boiling point of pentane to about 180° F. The feed fraction may also comprise a hydroformate secured from a typical hydroforming process.

In a typical hydroforming process, the feed to the hydroformer comprises a heavy naphtha, preferably, containing naphthenes and boiling in the range from about 180° to 420° F. The catalyst comprises molybdenum oxide on alumina or platinum on alumina. The temperature is generally in the range from about 850° to 925° F. and the pressure in the range from about 200 to 400 p.s.i.g. The amount of hydrogen utilized is in the range from about 1000 to 12,000 cubic feet per barrel, preferably, in the range from about 3000 to 6000 cubic feet per barrel. Hydrogen is recycled.

It has been known for some time that certain zeolites, both naturally-occurring and synthetic, have the property of separating normal from isomeric branch chained hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3–5 Angstrom units to 12–15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $$(CaNa)Al_2Si_4O_{12} \cdot 2H_2O$$

Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article "Molecular Sieve Action of Solids" appearing in Quarterly Reviews, vol. III, pp. 293–330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

After this sieve material is completely filled with normal paraffins to its saturation point, the feed is discontinued and a small amount of purge gas introduced in order to sweep out the remaining feed hydrocarbons from the space between the sieve particles. After the purging step, several alternative procedures are available for recovering the normal paraffins from the sieve. For example, the pressure may be reduced below the pressure utilized during the adsorption stage. As the pressure is reduced, the normal paraffins vaporize from within the pores of the sieve and are removed as vapors from the adsorption vessel.

When employing molecular sieves the size of the pore depends upon the molecular size of the material to be separated.

It must be large enough to adsorb the straight-chain but not large enough to adsorb the branched-chain isomers. The adsorptive capacity and pore size of the sieve, and the structure of the hydrocarbon are related in the following manner:

| Adsorbed on 4 A. and 5 A. | Adsorbed on 5 A. but not 4 A. | Not adsorbed on 4 A. or 5 A. | Adsorbed on 13 A. |
|---|---|---|---|
| (1) Ethane. | (1) Propane and higher n-paraffins. | (1) Iso-paraffins. | (1) All hydrocarbons within gasoline boiling range. |
| (2) Ethylene. | (2) Butene and higher n-olefins. | (2) Aromatics. | (2) Aromatics strongly adsorbed. |
| (3) Propylene. |  | (3) All cyclics with 4 or more atoms in ring. | (3) Diolefins strongly adsorbed. |

In general, when it is desired to increase the octane rating of naphthas and hydrocarbon streams boiling in the gasoline range, sieves having a pore diameter of 5 A. are satisfactory.

The isomerization stage may comprise a typical isomerization operation wherein wide operating conditions may be utilized. For example, the isomerization process may be carried out in the liquid phase utilizing an aluminum chloride catalyst supported on Porocel. The feed comprises less than about 0.2% olefins and the feed rate is in the range from 0.1 to 3.0 volumes of feed per volume of catalyst per hour. A preferred range is in the range from 0.5 to 1.0 volumes of feed per volume of catalyst per hour. The temperature is in the range from about 100° to 275° F., preferably in the range from about 150° to 225° F. The pressure is in the range from about 100 to 450 p.s.i. absolute, preferably, in the range from about 150 to 250 p.s.i.a. The catalyst is activated with about 0.1 to 5.0 wt. percent hydrogen chloride, preferably, with 1.0 to 2.0 wt. percent hydrogen chloride. Also utilized is 0.1 to 3.0 mol percent of hydrogen, preferably, 1.0 to 1.3 mol percent hydrogen. A cracking inhibitor such as benzene may be used in the concentration of 0.2 to 0.5 volume percent.

The process of the present invention may be more fully understood by reference to the drawings illustrating embodiments of the same.

Figure 2:
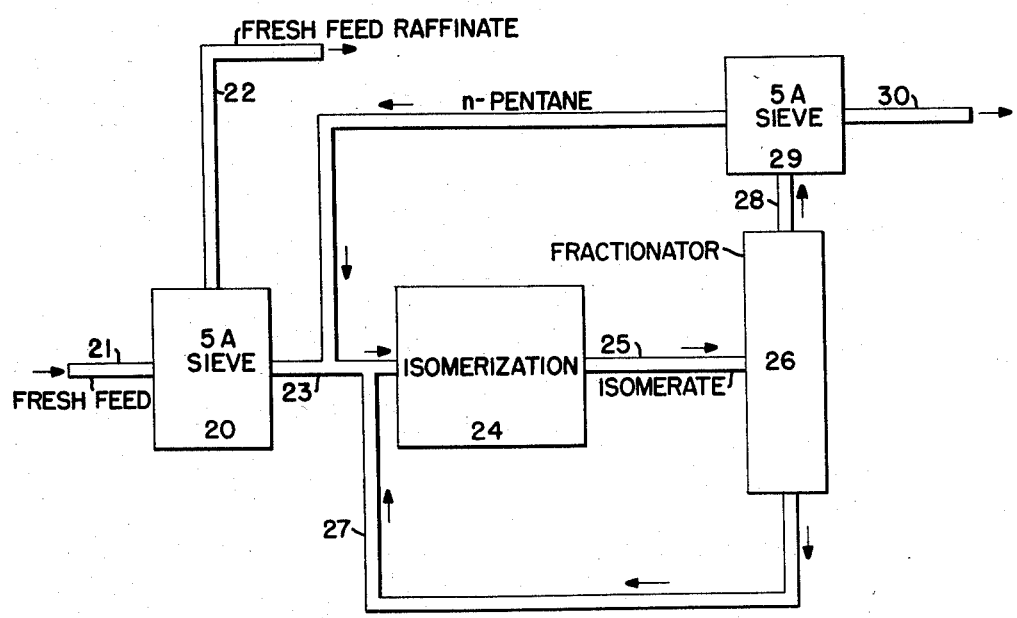

Figure 1 illustrates an operation wherein a single stage of a molecular sieve is utilized, while Figure 2 illustrates an operation wherein two molecular sieve stages are utilized.

Referring specifically to Figure 1, the feed fraction, which for the purpose of illustration, is assumed to be a light naphtha boiling in the range from the boiling point of normal pentane to about 180° F., is introduced into absorption stage 1 by means of feed line 2. Stage 1 is packed with 5 A. molecular sieves. In order to simplify the description, the necessary equipment for desorption etc. is not shown since the techniques of adsorption and desorption are well known in the art. The feed fraction introduced into stage 1 contains high octane number constituents as, for example, isopentane; 2,2-dimethyl butane; 2,3-dimethyl butane; benzene and the like. This feed fraction also contains relatively low number constituents as, for example, normal pentane and normal hexane. The temperature in stage 1 on the adsorption cycle is maintained in the range from about 150° to 400° F., preferably, in the range from 200° to 250° F., such as 225° F. The temperature on the desorption cycle in stage 1 is maintained in the range from about 450° to 800° F., preferably, in the range from 600° to 700° F., such as 650° F. The pressure on the adsorption cycle is in the range from about atmospheric to 100 p.s.i.a., preferably, atmospheric to 60 p.s.i.a., such as 30 p.s.i.a., while the pressure on the desorption cycle is in the range from about 10 mm. to 100 p.s.i.a., preferably, less than the adsorbtion pressure. The lower desorption pressures may be reached by stripping as well as by vacuum.

Under the conditions as stated, normal pentane and normal hexane will be adsorbed on the sieve while high octane number constituents will pass through stage 1 and are removed from stage 1 by means of line 3. This product may be handled and blended as desired. At a predetermined saturation point, stage 1 will be placed on the desorption cycle and the normal pentanes and normal hexanes removed from the sieve by suitable means known in the art. It is to be understood that a plurality of sieve stages may be employed in order to secure a continuous process.

A fraction comprising essentially normal pentane and normal hexane is removed from stage 1 by means of line 4 and passed into isomerization stage 5 operated as described. An isomerate fraction comprising isopentane, normal pentane, 2,2-dimethyl butane, 2,3-dimethyl butane, 2-methyl butane, 3-methyl pentane and normal hexane is withdrawn from isomerization stage 5 by means of line 6 and introduced into fractionation zone 7. Temperature and pressure conditions in fractionation zone 7 are controlled so as to remove overhead a part of 2,3-dimethyl butane and also have in the bottoms fraction a part of the 2,3-dimethyl butane.

Under these conditions the overhead removed from fractionation zone 7 by means of line 8 comprises isopentane, normal pentane, 2,2-dimethyl butane and 2,3-dimethyl butane. This material is recycled with the fresh feed to stage 1. The bottoms fraction removed from fractionation zone 7 by means of the line 9 comprises 2,3-dimethyl butane, 2 methyl pentane, 3 methyl pentane and normal hexane. This stream is recycled to isomerization zone 5.

By operating as described, a maximum octane number improvement is achieved for normal pentane and normal hexane. A maximum yield of product is also secured as well as complete removal and conversion of normal pentane and normal hexane to isoparaffins. Also all the methyl pentanes are returned to the isomerization zone for conversion to dimethyl butanes of high octane number.

Referring specifically to Figure 2, a feed fraction boiling in the range from normal pentane to about 180° F. is introduced into adsorption zone 20 by means of line 21. The adsorption contains 5 A. sieves and the operation is similar as described with respect to Figure 1. A high octane number fraction is removed from zone 20 by means of line 22 and handled as desired; either utilized as a blending stock or further treated to enhance its octane number. A fraction comprising normal pentane and normal hexane is removed from stage 20 by means of line 23 and introduced to an isomerization zone 24, which is operated as described with respect to Figure 1.

The isomerate fraction is removed from zone 24 by means of line 25 and introduced into fractionation zone 26. Here again the fractionation zone is operated as described with respect to Figure 1 wherein the bottoms fraction comprises 2,3-dimethyl pentane, 2 methyl pentane, 3 methyl pentane and normal hexane. This fraction is withdrawn from the bottom of zone 26 by means of line 27 and recycled to the isomerization zone 24. The overhead is withdrawn from zone 26 by means of line 28 and introduced into a secondary sieve stage 29 containing 5 A. sieves.

This overhead fraction comprises isopentane, normal pentane, 2,2-dimethyl butane and 2,3-dimethyl butane. Stage 29 is operated as described with respect to stage 20. A high octane number fraction is removed from stage 29 by means of line 30 and handled as desired. This fraction, however, is preferably, blended with the high octane number fraction removed by means of line 22. At a predetermined saturation point, normal pentanes are removed from the sieve by known means and recycled to the isomerization stage 24 by means of line 31. Here again, a plurality of sieve stages may be employed to secure a continuous operation.

As pointed out, the present invention is concerned with an integrated operation for the upgrading of naphtha fractions, particularly, those fractions containing pentane and hexane wherein a particular combination of sieve stages and isomerization stages and a fractionation stage is utilized. The process produces a high quality gasoline or gasoline boiling fraction of high octane numbers.

What is claimed is:

1. An improved process for the production of high octane number hydrocarbons from a feed fraction containing a substantial portion of normal pentane and normal hexane along with high octane hydrocarbon constituents which comprises, contacting said feed fraction with molecular sieve zeolites in an adsorption zone so as to adsorb normal pentane and normal hexane in said zeolites while withdrawing as products un-adsorbed high octane hydrocarbon constituents from said adsorption zone, thereafter recovering normal pentane and normal hexane from said molecular sieve zeolites, passing said recovered normal pentane and normal hexane to an isomerization zone so as to form an isomerate containing dimethyl butanes along with isopentane, withdrawing said isomerate and subjecting it to fractionation in a fractionation zone so as to segregate an overhead fraction containing isopentane, dimethyl butanes and normal pentane, contacting said overhead fraction with molecular sieve zeolites so as to adsorb said normal pentane while recovering high octane constituents as products, and de-adsorbing said normal pentane and recycling it to said isomerization zone for further conversion to high octane constituents.

2. The improved process of claim 1 wherein said overhead fraction is passed directly to said adsorption zone treating said initial feed fraction in order to adsorb normal pentanes for ultimate passage to said isomerization zone.

3. The improved process of claim 1 wherein said overhead fraction is treated in an adsorption zone distinct from the adsorption zone treating said initial feed fraction.

4. The improved process of claim 1 wherein said feed fraction comprises a hydrocarbon fraction boiling from the boiling point of normal pentane to about 180° F.

5. The improved process of claim 1 wherein a bottoms fraction obtained from said fractionation zone is recycled to said isomerization zone in order to form additional quantities of high octane constituents.

6. An improved process for obtaining high octane materials from a hydrocarbon fraction boiling within the range of the boiling point of normal pentane and about 180° F., said fraction containing substantial proportions of normal pentane and normal hexane along with high octane constituents which comprises, contacting said hydrocarbon fraction with molecular sieze zeolites in an adsorption zone so as to adsorb normal pentane and normal hexane while recovering un-adsorbed high octane constituents, de-adsorbing said normal pentane and normal hexane and passing them to an isomerization zone wherein they are converted to an isomerate comprising isopentane and dimethyl butanes, subjecting said isomerate to fractionation in a fractionation zone so as to recover an overhead stream comprising isopentane and dimethyl butanes along with normal pentane, recycling at least a portion of the bottoms fraction of said fractionation zone to said isomerization unit for further conversion therein, separating normal pentane from said overhead stream by contacting it with molecular sieve zeolites thus recovering high octane materials from said overhead stream, and passing said separated normal pentane to said isomerization zone for further conversion to high octane materials.

7. The process of claim 6 wherein said bottoms fraction recycled to said isomerization zone comprises normal hexane and methyl pentanes.

References Cited in the file of this patent

UNITED STATES PATENTS

| | | |
|---|---|---|
| 2,394,797 | McAllister et al. | Feb. 12, 1946 |
| 2,425,535 | Hibshman | Aug. 12, 1947 |
| 2,436,944 | Sutherland | Mar. 12, 1948 |
| 2,443,607 | Evering | June 22, 1948 |
| 2,818,449 | Christensen et al. | Dec. 31, 1957 |